US012262191B2

(12) United States Patent
Walther et al.

(10) Patent No.: US 12,262,191 B2
(45) Date of Patent: Mar. 25, 2025

(54) LOWER LAYER REPRODUCTION

(71) Applicant: Fraunhofer-Gesellschaft zur Förderung der angewandten Forschung e.V., Munich (DE)

(72) Inventors: Andreas Walther, Erlangen (DE); Yannik Grewe, Erlangen (DE); Julian Klapp, Erlangen (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 198 days.

(21) Appl. No.: 17/501,974

(22) Filed: Oct. 14, 2021

(65) Prior Publication Data

US 2022/0038838 A1 Feb. 3, 2022

Related U.S. Application Data

(63) Continuation of application No. PCT/EP2020/060577, filed on Apr. 15, 2020.

(30) Foreign Application Priority Data

Apr. 16, 2019 (EP) .................................... 19169676
Oct. 9, 2019 (EP) .................................... 19202209

(51) Int. Cl.
*H04S 7/00* (2006.01)
*H04R 3/04* (2006.01)
(Continued)

(52) U.S. Cl.
CPC ............... *H04S 7/302* (2013.01); *H04R 3/04* (2013.01); *H04R 5/02* (2013.01); *H04R 5/04* (2013.01);
(Continued)

(58) Field of Classification Search
CPC .......... H04S 7/301; H04S 7/302; H04S 3/008; H04S 2400/01; H04S 2400/07;
(Continued)

(56) References Cited

U.S. PATENT DOCUMENTS 6,359,994 B1 * 3/2002 Markow ............... G06F 1/1632 381/388
10,171,930 B1 * 1/2019 Brown .................... H04S 7/307
(Continued)

FOREIGN PATENT DOCUMENTS

CN 101150890 A 3/2008
CN 101816193 A 8/2010
(Continued)

OTHER PUBLICATIONS

Marantz, "NR1608 AV Receiver", Internet, Jun. 1, 2017 (Jun. 1, 2017), URL: https://www.us.marantz.com/shop/avreceivers/nr1608?status=discontinue, (Jun. 16, 2020), XP055705610.
(Continued)

*Primary Examiner* — William A Jerez Lora
(74) *Attorney, Agent, or Firm* — Perkins Coie LLP; Michael A. Glenn

(57) ABSTRACT

An audio processor for reproducing multichannel audio has a normal layer processing and a lower layer processing. The normal layer processing is configured for processing one or more channels of the object-specific audio or the multichannel audio belonging to a normal layer. The lower layer processing is configured for processing at least one channel or more channels of the object-specific audio or the multichannel audio belonging to a lower layer. The lower layer processing is configured to feed at least one signal belonging to the one channel or the more channels of the lower layer to a subwoofer output.

20 Claims, 5 Drawing Sheets

(51) Int. Cl.
*H04R 5/02* (2006.01)
*H04R 5/04* (2006.01)
*H04S 3/00* (2006.01)

(52) U.S. Cl.
CPC .............. *H04S 3/008* (2013.01); *H04S 7/301* (2013.01); *H04S 2400/01* (2013.01); *H04S 2400/07* (2013.01); *H04S 2400/11* (2013.01); *H04S 2420/01* (2013.01)

(58) Field of Classification Search
CPC ... H04S 2400/11; H04S 2420/01; H04R 3/04; H04R 5/02; H04R 5/04
USPC ....................................... 381/58, 59, 84, 303
See application file for complete search history.

(56) References Cited

U.S. PATENT DOCUMENTS

| | | | |
|---|---|---|---|
| 2006/0233378 A1 | 10/2006 | Kim et al. | |
| 2008/0187156 A1 | 8/2008 | Yokota | |
| 2008/0199033 A1* | 8/2008 | Decanio | H04R 1/2834 381/349 |
| 2010/0166238 A1* | 7/2010 | Lee | H04S 3/00 381/310 |
| 2010/0220864 A1 | 9/2010 | Martin et al. | |
| 2013/0251156 A1 | 9/2013 | Katayama | |
| 2015/0023505 A1* | 1/2015 | Morrow | H04S 7/305 381/17 |
| 2015/0223002 A1 | 8/2015 | Mehta et al. | |
| 2015/0237446 A1 | 8/2015 | Katayama et al. | |
| 2016/0150347 A1 | 5/2016 | Fischer et al. | |
| 2016/0183027 A1 | 6/2016 | Morrow | |
| 2018/0103316 A1 | 4/2018 | Faller et al. | |
| 2018/0367939 A1 | 12/2018 | Fischer et al. | |

FOREIGN PATENT DOCUMENTS

| | | | |
|---|---|---|---|
| CN | 104604257 | A | 5/2015 |
| CN | 104641659 | A | 5/2015 |
| CN | 105340300 | A | 2/2016 |
| CN | 107873135 | A | 4/2018 |
| CN | 108141692 | A | 6/2018 |
| EP | 1562401 | A2 | 8/2005 |
| EP | 3163915 | A1 | 5/2017 |
| JP | 2002078072 | A | 3/2002 |
| JP | 2013201559 | A | 10/2013 |
| JP | 2016527799 | A | 9/2016 |
| JP | 2018121309 | A | 8/2018 |
| WO | 2013006330 | A2 | 1/2013 |
| WO | 2017021162 | A1 | 2/2017 |
| WO | 2017031016 | A1 | 2/2017 |

OTHER PUBLICATIONS

Hamasaki, Kimio , "The 22.2 multichannel sounds and its reproduction at home and personal environment", AES 43rd International Conference, Pohang, Korea, Sep. 29-Oct. 1, 2011.

* cited by examiner

LOWER LAYER REPRODUCTION

CROSS-REFERENCE TO RELATED APPLICATIONS

This application is a continuation of copending International Application No. PCT/EP2020/060577, filed Apr. 15, 2020, which is incorporated herein by reference in its entirety, and additionally claims priority from European Application No. 19169676.4, filed Apr. 16, 2019, and from European Application No. 19202209.3, filed Oct. 9, 2019, which are both incorporated herein by reference in their entirety.

BACKGROUND OF THE INVENTION

Embodiments of the present invention refer to an audio processor for reproducing multi-channel audio and to a corresponding method. Another embodiment refers to an audio system for reproducing multichannel audio comprising an audio processor. Embodiments refer to a lower layer reproduction for a soundbar. In general, the invention is within a technical field of audio reproduction using the specific hardware and/or a specific signal processing.

For sound reproduction, especially movie sound reproduction, there are different kinds of systems which differ with regard to their complexity and reproduction quality. The reference for movie sound is the cinema. Cinemas provide multi-channel surround sound, with loud-speakers installed not only in front of the screen, but additionally on the sides and rear. The side and rear loudspeakers enable an enveloping and immersive surround sound.

With the emergence of immersive, interactive, and object-based audio content, additional dimensions, e.g. height, have been added.

Enhanced reproduction setups for realistic sound reproduction use loudspeakers not only mounted in the horizontal plane (usually at or close to ear-height of the listener), but additionally also spread in vertical direction. Those loudspeakers are e.g. elevated (mounted on the ceiling, or at some angle above head height) or are placed below the listener's ear height (e.g. on the floor, or on some intermediate or specific angle).

With latest coding techniques, the underlying multi-channel audio content can not only be used in professional environments, but can also be conveniently transmitted into the consumer's home.

In a home environment, likely only enthusiasts will install the amount of loudspeakers needed to replicate the loudspeaker setups that are used in professional environments and in research labs. A convenient alternative to those rather complex setups are compact reproduction systems that use signal processing means to generate a comparable or similar spatial auditory perception as the loudspeaker setups. One specific class of such compact reproduction systems often goes by names like soundbar, soundbase, boombox or the like and will for simplicity reasons be termed only soundbar (s) in the following. Many variations of such soundbars exist on the market. Soundbars are a practical and attractive solution for an enhanced audio reproduction which is easy to install. Usually they are completely integrated active audio playback systems that include all components needed for audio playback in a single device. Most of them come with an external wireless or wired subwoofer to support the low frequency reproduction, some models offer additional wirelessly connected satellite surround loudspeakers.

The added height dimension in the new reproduction formats also offers new possibilities for the soundbar category to process and spatially distribute the additional signals.

Systems that address the reproduction of heights signals that come from above the listener's ear height are already in the market. These use e.g. specifically tilted loudspeakers or arrays of loudspeakers to make use of ceiling reflections to generate sound reproduction perceived from above.

However, real three-dimensional sound reproduction should of course also consider sounds that reach the listener from below head-height. Some enhanced production and reproduction systems consider sound from below. Some available systems feature a lower layer including three loudspeakers (cf. "The 22.2 multichannel sounds and its reproduction at home and personal environment", Kimio Hamasaki, AES 43$^{rd}$ International Conference, Pohang, Korea, 2011 Sep. 29-Oct. 1).

In contrast to height signals from above, the present invention targets the problem of how height signals from below ear level can be conveniently reproduced.

Therefore, it is the technical objective to provide a concept for reproducing a lower layer signal, especially by sound systems which are easily to be installed.

SUMMARY

According to an embodiment, an audio processor for reproducing object-specific audio or multichannel audio may have: a normal layer processor configured for processing one or more channels of the object-specific audio or the multichannel audio belonging to a normal layer; a lower layer processor configured for processing at least one channel or more channels of the object-specific audio or the multichannel audio belonging to a lower layer, wherein the normal layer is a listening layer laying within a height of a listener's head as seen from a listener's perspective and wherein the normal layer lies above the lower layer as seen from the listener's perspective; wherein the lower layer processor is configured to feed at least one signal belonging to the one channel or the more channels of the lower layer to a subwoofer output, so as to reproduce the one or more channels of the lower layer using a subwoofer wherein frequencies of a frequency portion of the one or more channels of the lower layer are above 150 Hz or even above 300, 500 or 1000 Hz so as to be high enough to enable a localization of the sound generated by the subwoofer.

According to another embodiment, an audio system for reproducing multichannel audio may have: an above inventive audio processor for reproducing multichannel audio; at least one soundbar or sound system for reproducing a normal layer; and at least one subwoofer or at least one two-way audio loudspeaker or multi-way loudspeaker for reproducing the lower layer.

According to another embodiment, a method for reproducing multichannel audio may have processing one or more channels of object-specific audio or multichannel audio belonging to a normal layer; processing at least one channel or more channels of the object-specific audio or the multichannel audio belonging to a lower layer; wherein the normal layer lies above the lower layer, wherein the processing of the one or more channels of the lower layer has a sub-step of feeding at least one signal belonging to the one or more channels of the lower layer to a subwoofer output.

Another embodiment may have a non-transitory digital storage medium having stored thereon a computer program for performing a method for reproducing multichannel audio, having processing one or more channels of object-specific audio or multichannel audio belonging to a normal layer; processing at least one channel or more channels of the object-specific audio or the multichannel audio belonging to a lower layer; wherein the normal layer lies above the lower layer, wherein the processing of the one or more channels of the lower layer has a sub-step of feeding at least one signal belonging to the one or more channels of the lower layer to a subwoofer output, when said computer program is run by a computer.

Embodiments of the present invention provide an audio processor for producing multichannel audio. The processor comprises a normal layer processing as well as a lower layer processing. The normal layer processing is configured to process one or more channels of the object-specific audio or the multichannel audio belonging to a normal layer. Here, for example, a left and a right channel may be reproduced or a left, right, center, rear left, and rear right channel may be reproduced. The lower layer processing is configured to process at least one channel or more channels of the object-specific audio or the multichannel audio belonging to a lower layer. The lower layer processing is configured to feed at least one signal belonging to or resulting from the one channel or the more channels of the lower layer to a subwoofer output.

According to a further embodiment, the lower layer processing is configured to feed at least one signal belonging to a first of the one or more channels of the lower layer to a first subwoofer output and to feed at least another signal belonging to a second of the one or more channels of the lower layer to a second subwoofer output. For example, the subwoofer connected to the first subwoofer output may be positioned on a left side, while the subwoofer connected to the second subwoofer output may be arranged at the right side. According to this embodiment, the first subwoofer output is assigned to a first lateral room direction (here left), wherein the second subwoofer output is assigned to a second lateral room direction (here right). These two room directions are different from each other.

Embodiments of the present invention are based on the finding that the reproduction of lower layer sounds can be done by making use of subwoofers. Background thereof is that subwoofers are usually directly placed on the floor. The usage of subwoofers, especially by feeding frequencies for which a localization is enabled (e.g. above 100 Hz) to same, enable consumers to obtain the benefits of lower layer sound reproduction also in consumer audio reproduction systems according to embodiments, those consumer audio reproduction systems are represented by soundbar systems. Background thereof is that most soundbar systems come with an external wired or wireless subwoofer to support the low frequency sound reproduction that can usually not be achieved with the often rather small soundbar enclosures and transducers. This subwoofer can be used for reproducing the floor level/lower level sound. Furthermore, it should be noted that this approach may beneficially be used as retrofit for upgrading already available systems.

Such lower level sounds (additional wording may be: floor level sounds, lower layer sound, bottom layer; note the term level does not refer to 'sound pressure level', but rather to the 'altitude niveau'/height, here. Floor level does not necessarily indicate, that the loudspeakers have to be positioned on the physical floor of the reproduction room) are part of immersive audio production and reproduction systems in professional and laboratory environments. The benefit of including floor level sound reproduction in controlled environments has been shown in listening tests.

Note, the normal layer processing can perform the processing of the layer substantially in the height of the listener's head (L, R, C, RL, RR) or all other channels, e.g. including height signals (layer above normal layer).

Excurse: a subwoofer is a loudspeaker that is dedicated to play back low frequency sounds; therefore, usually rather large volumes are used for the enclosure and large membranes are used to be able to reproduce low frequencies. Usually, subwoofers operate in a frequency range where the origin (direction) of the sound-producing device cannot be determined by the listener due to room-acoustic or psycho-acoustic reasons; Therefore, the positioning of a subwoofer is rather flexible.

According to an embodiment, the one signal of the one or more channels of the lower layer comprises a frequency portion which comprises only frequencies above the frequency portion of one or more LFE channels, or which is above the crossover frequencies of the one or more channels of the normal layer, or which is above selected crossover frequencies of the one or more channels of the normal layer. According to a further embodiment, the one signal of the one or more channels of the lower layer comprises a frequency portion which comprises only frequencies above 80 Hz, above 100 Hz, above 120 Hz, above 150 Hz, above 200 Hz, above 300 Hz, above 500 Hz, above 1000 Hz. Note—according to an embodiment—the frequencies of the frequency portion of the one or more channels of the lower layer are high enough to enable to a localization of the sound.

According to embodiments, the audio processing comprises a LFE/bass processing which is configured to feed one or more LFE channels of the object-specific audio or the multi-channel audio or low frequency portions of the one or more channels of the normal layer to the subwoofer. Here, the lower layer processing may—according to an embodiment—be configured to route a low frequency portion of the one or more channels of the lower layer to the LFE/bass processing.

According to an embodiment the lower layer processing is configured to route a high frequency portion of the one or more channels of the lower layer to the normal layer processing, such that this high frequency portion is reproduced together with the one or more channels of the normal layer. Thus, the high frequency portion of the one or more channels of the lower layer is optionally reproduced via the normal layer processing by use of a reduced amplification, when compared to the amplification of the portion reproduced via the lower layer, and/or, wherein the higher frequency portion is optionally reproduced via the normal layer processing in a delayed manner, when compared to the portion reproduced via the lower layer processing. According to embodiments, the lower layer processing comprises a bandpass filter for defining a frequency range of the one or more channels of the lower layer. According to another embodiment, the lower layer processing is configured to route a low frequency portion below the defined frequency range of the one or more channels of the lower layer to the LFE/bass processing, wherein the low frequency portion processed by the LFE/bass processing results in signals complementary to signals resulting from the lower portion of the bandpass filtering.

Note the normal layer may advantageously be reproduced using a soundbar or a sound system (e.g. 2.1 or 5.1). Typically, the normal layer is a listening layer laying within a height of a listener's head as seen from a listener's perspective, wherein the normal layer lies above the lower layer as seen from the listener's perspective.

According to further embodiments, the audio processor may comprise a height layer processing for processing one or more channels of the object-specific audio or the multi-channel audio belonging to a height layer.

According to further embodiments, the processor may comprise a calibration unit for performing a calibration procedure, wherein the calibration procedure includes a calibration for calibrating the one or more channels of the lower layer reproduced by use of a subwoofer output.

According to further embodiments, the processor may comprise an up-/downmixing unit which is configured to perform an upmixing/downmixing of the lower layer out of one or more channels of the normal layer, e.g. for conventional stereo/multichannel audio (that does originally not contain lower layer signals) and/or which is configured to perform a rendering of objects arranged at lower positions to the lower layer for object-specific audio.

Another embodiment provides an audio system for reproducing multichannel audio, comprising: an audio processor for reproducing multichannel audio; a soundbar or sound system for reproducing a normal layer; as well as a subwoofer or a two-way audio speaker or multi-way loudspeaker for reproducing the lower layer.

The subwoofer or the two-way audio speaker or multi-way audio speaker may be arranged at the floor. According to embodiments, the subwoofer or the two-way audio speaker or multi-way audio speaker comprises a midrange transducer or a tweeter.

Another embodiment provides a method for reproducing multichannel audio, comprising:

- processing one or more channels of the object-specific audio or the multichannel audio belonging to a normal layer;
- processing at least one channel or more channels of the object-specific audio or the multichannel audio belonging to a lower layer.

Here, the processing of the one or more channels of the lower layer comprise a sub-step of feeding at least one signal belonging to the one or more channels of the lower layer to a subwoofer output. This method may be performed by use of a computer, i.e. an embodiment provides a computer program, for performing, when running on a computer the method.

BRIEF DESCRIPTION OF THE DRAWINGS

Embodiments of the present invention will be subsequently discussed referring to the enclosed figures, in which.

DETAILED DESCRIPTION OF THE INVENTION

Figure 1:
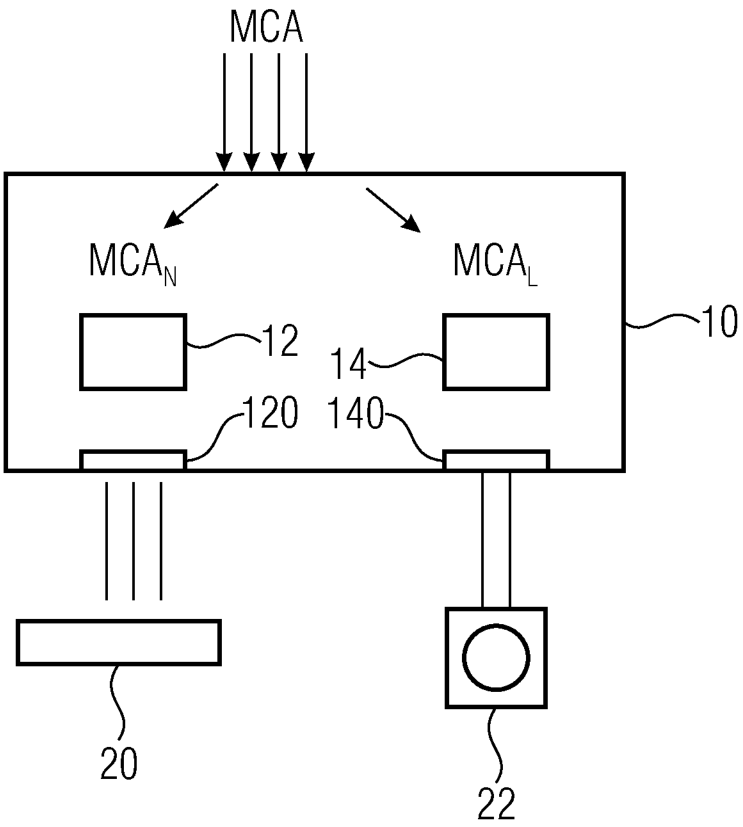
FIG. 1 shows a block diagram of an audio processor according to a first embodiment.

Below, embodiments of the present invention will subsequently be discussed referring the enclosed figures, wherein identical reference numerals are provided to objects having similar or identical function so that the description thereof is mutually applicable and interchangeable.

Before discussing the approach of reproducing a lower layer according to an inventive approach, different methods for sound reproducing using soundbars will be discussed. Embodiments of the present invention make use of these sound reproducing techniques, e.g., for reproducing the normal layer (cf. FIG. 1).

One class of devices are based on 'psychoacoustic methods' or the like, i.e. the reproduction system applies a processing that tries to evoke at the listener's ears auditory ques that generate a percept of sound coming from a specific direction, advantageously another direction than that of the actual sound reproduction device. Such methods go by names like e.g. cross-talk cancelation, HRTF processing, binaural processing, psychoacoustic filtering, etc . . . , in general virtualization processing.

Similar to such reproduction methods being used for horizontal and elevated height reproduction, also a reproduction of floor level sounds in soundbar systems could be achieved by psychoacoustic methods (e.g. HRTF processing).

Another method of reproducing sound by soundbar devices is based on (room) acoustic methods. Sounds can for example be steered or directed to reflective surfaces (by either positioning loudspeakers in a beneficial way, or by using array processing such as beamforming). The reflective boundaries of the listening environment (which is usually a common living room in consumer homes), will reflect the sound towards the listener's position. Such, the perception of sound emanating from the ceiling or a wall, or a position somewhere behind the actual wall can be evoked.

For the reproduction of surround and overhead sounds, such methods are already in use. One could also target the objective of lower layer sound reproduction by using the reflective approach as has been used for elevated sound reproduction. However, in contrast to the propagation path and acoustic properties that can be expected when using a ceiling as reflective boundary surface (where a ceiling is usually quite predictable and standard), the acoustic properties of the path via the floor can be heavily varying. The floor may e.g. be covered with diverse carpeting or a hard floor, both of which behave totally different in terms of their acoustic properties. While such acoustic properties could be taken care of by measuring the actual properties in the present environment, further problems arise with that method of reproduction. Tables can be positioned between the sound reproduction device and the listening space which either act as diffusors, or in the worst case totally block sound propagation via that path. Furthermore, if the soundbar is positioned on a shelf, but not aligned with the front edge of the shelf, such a 'downfiring' approach would directly be targeted towards the close-by shelf.

Below with respect to FIG. 1 another approach according to the present invention will be discussed enabling lower layer reproduction.

FIG. 1 shows an audio processor 10 comprising a normal layer processing 12 and a lower layer processing 14. The audio processor 10 receives an object-specific audio or a multi-channel audio signal MCA, which may consist out of a plurality of separate channels, or by a signal to be downmixed or to be upmixed or as object specific audio or any other surround sound format.

This MCA signal is divided into at least two multichannel audio signal portions, namely a portion to be reproduced as normal layer (i.e., in a height substantially complying to the position of the listener's head (cf. $MCA_N$) and into a lower layer portion $MCA_L$, i.e., a portion for reproducing the lower level sound/floor level sound below the height of the listener's head.

The $MCA_N$ is processed by the normal layer processing 12 and may comprise a plurality of channels, e.g., left and right. These channels may be fed to an output, e.g., connected to a soundbar 20, which may be arranged at the listener's head height. The outputs for the normal layer processing are marked by 12*o*.

The $MCA_L$'S signals are reproduced using the lower layer processing 14. Further, this is configured to process the at least one or more channels of the multichannel audio belonging to the lower layer by feeding at least one signal belonging the one or more channels of the lower layer to a subwoofer output 14*o*. Via this approach, the $MCA_L$ signal is reproduced using a subwoofer 22, which typically is positioned at the floor of the listening room so that sound output by the subwoofer 22 seems to be localized at the floor level.

According to embodiments, the frequency portion to be reproduced by use of the lower layer processing 14 is above the typical subwoofer frequencies, such that the frequencies are high enough to enable a localization of the sound source. For example, the frequencies may be above 150 Hz or above 100 Hz, or even above 300, 500 or 1000 Hz.

Figure 2A:
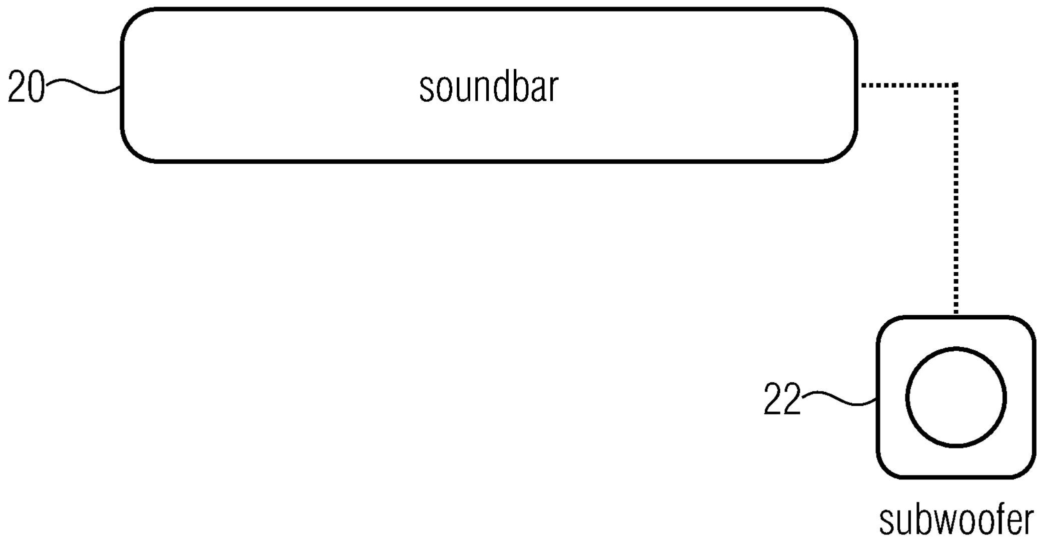
FIG. 2*a* shows a block diagram of a sound system to be used in combination with the above processor according to further embodiments.

FIG. 2 shows a common soundbar system with the soundbar 20 and the subwoofer 22. Here, the subwoofer 22 may be connected to the soundbar by being used wired or wirelessly. This sound system comprising the elements 20 and 22 may be driven by the audio processor 10 as discussed with respect to FIG. 1.

Regarding the normal sound processing 12 it should be noted that same may also use the subwoofer 22 via the output 14*o* in order to reproduce the low frequency effect (LFE) signals contained with the sound signal $MCA_N$ and/or to reproduce low frequencies split out the $MCA_N$ signal by use of a crossover.

Some enhanced sound reproduction systems make use of two LFE channels/signals, this is an additional benefit over common systems using just one subwoofer 22. So both individual LFE signals can be reproduced with individual/dedicated subwoofers 22. If only one LFE channel is present in the input signal, this can be reproduced using both subwoofers (not shown).

In common systems, the subwoofers 22 are used to play back the bass signals that cannot be reproduced by the soundbar 20 itself. For that purpose, usually (and also in the proposed system), a bass management system can be/is used. Such bass management systems usually divide the reproduced sounds into a low frequency portion (that is routed to the subwoofer 22) and a high frequency portion (that is played back by the soundbar 20).

It should be noted that bass management may also be referred to as LFE/bass processing. The bass management (in sense of bass processing) enables to forward low frequency portions of the one or more channels of the normal layer to the LFE channel/subwoofer. Bass management (in sense of LFE processing) may also comprise processing of the low frequency portions or the LFE signal(s) forwarded to the LFE channel(s)/subwoofer(s), e.g. when different types of subwoofers are used or when the subwoofer has a certain amplification/phase correction due to its position in the room.

Figure 2B:
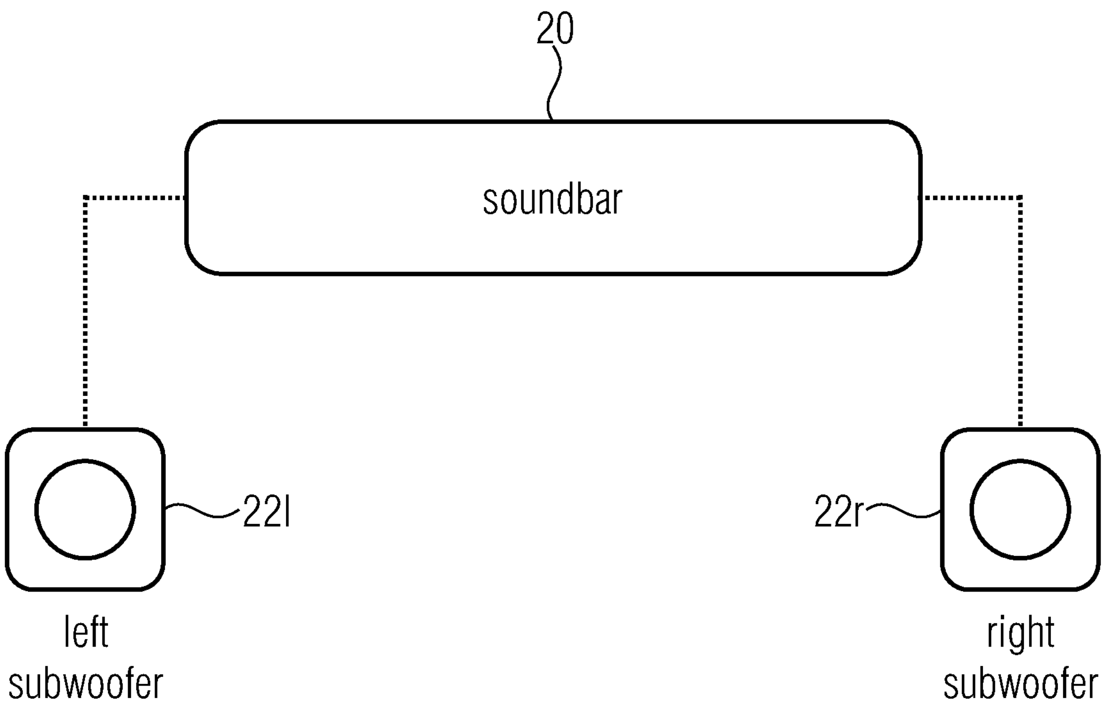
FIG. 2*b* shows another block diagram of another sound system to be used in combination with the above-described processor according to further embodiments.

FIG. 2*b* shows another sound system comprising the soundbar 20 as well as two subwoofers 22*l* and 22*r*. Background thereof is that some advanced audio reproduction systems feature two LFE channels (e.g., "The 22.2 multichannel sounds and its reproduction at home and personal environment"). And also in literature benefits of using uncorrelated lower frequency bass signals have been discussed.

These two subwoofers 22*l* and 22*r* can be driven by the lower layer reproduction 14 as discussed above. Beneficial with two subwoofers is, that the low frequency part can be routed to two subwoofers 22*l*, 22*r*, and such stereophonic effects can be reproduced and such be preserved if they have been present in the input signals.

According to embodiments the subwoofers 22*l*, 22*r* are now also used to play (for specific input channels or object positions, namely the once corresponding to a lower layer) also higher frequency sound, for which likely already a sound localization by a listener is possible. Since the subwoofers 22*l*, 22*r* are placed on the floor, those specifically routed sounds will also be perceived as coming from the floor level. This is exactly the intend of floor level sound, and such a convenient solution to solve that problem for consumer audio playback via soundbar devices. Note, the general idea as discussed with respect to FIG. 1 and FIG. 2*a* works with only one subwoofer 22, which would then receive a mono-downmix of the lower array signals $MCA_L$, while according to the enhanced approach, the $MCA_L$ is assigned to the different room directions and fed to the corresponding subwoofer outputs.

Of course, the two subwoofers 22*l* and 22*r* may also be used by the normal layer processing 12 to reproduce the LFE signals or the low frequencies belonging to the MCA signals which are filtered out of the signal fed to the soundbar 20.

Usually, subwoofers 22*l*, 22*r* are used to support the low frequency reproduction, because the low frequency components of the content can usually not be reproduced by the often small loudspeakers built into soundbars. (The same is true for loudspeaker systems using small satellite loudspeakers and a subwoofer.)

For specific LFE (low frequency effect) signals, those low frequency signals also have a rather high energy and can therefore not be reproduced by the normal loudspeakers or the transducers in the soundbar enclosure.

In addition to only playing back the LFE signal, the subwoofer in soundbar systems (or also in conventional loudspeaker systems featuring small satellites-style loudspeakers and a subwoofer) feature bass management systems.

Basically, bass management systems contain a high-pass filter for each of the input channels and a corresponding/complementary low pass filter. The high pass part of the main channels is routed to the primary reproduction means (either e.g. small loudspeakers, or a soundbar), while the low-pass parts of all the channels plus the LFE input signal are routed to a subwoofer. Usually, the crossover frequency between the high-pass and the low-pass part is somewhere around 100 Hz (maybe between 80 Hz and 120 Hz, but that frequency is not exactly fixed/standardized and can be chosen by the system's manufacturer).

Figure 3:
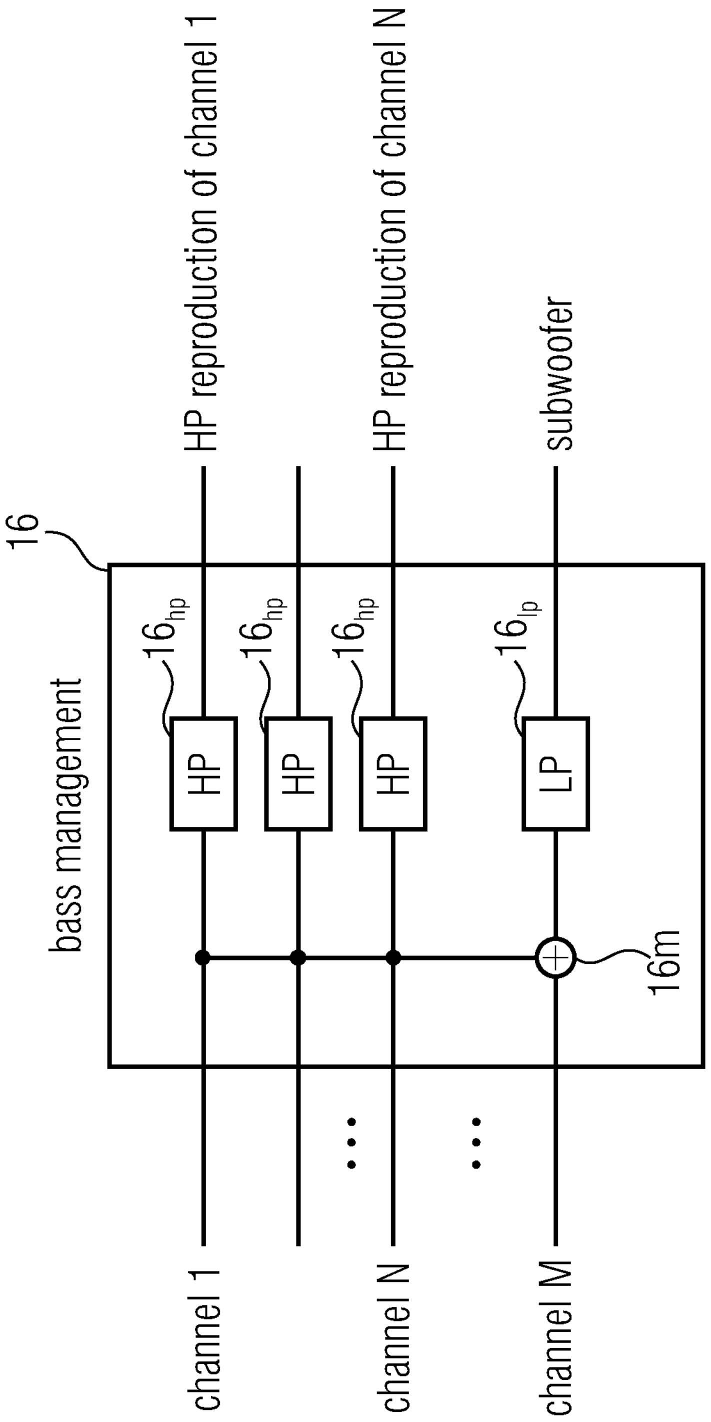
FIG. 3 shows an exemplary block diagram of a generic bass management to be used in combination with embodiments.

This generic mono-bass management for enhancing the above described audio processor 10 is illustrated by FIG. 3. FIG. 3 shows an exemplary block diagram of a generic mono-bass management 16 (i.e., playing back the low frequency sound using only a single subwoofer as described in context of FIG. 2*a*).

The bass management 16 receives a plurality of channels 1, N, M, wherein the channels 1 to N are the channels belonging to the normal layer (cf. $MCA_N$) which are high pass filtered by the filters 60*hp* and forwarded to be reproduced, e.g., to the entity 12. The low pass portion of all channels 1-N as well as M is extracted (filtered) and forwarded by the low pass filter 16_lp_, such that the low pass portion can be fed to the subwoofer. The channel M is also forwarded to the low pass filter 16_lp_ directly and fed after low pass filtering by the low pass filter 16_lp_ to the subwoofer. Note, that the mixer 16_m_ adds all low pass signals from the channels 1 to N and the signal of the channel M. Note, that the low pass filter 16_lp_ receives the entire frequency band of all signals 1 to M. According to embodiments, different variants of such systems exist, and sometimes the LFE input is also boosted by a specific amount. As illustrated by FIG. 3, channel M is directly processed by the low pass filter 16_lp_ without processing same using the high pass filters 16_hp_. For example, channel M can represent the input for the LFE signal.

Figure 4:
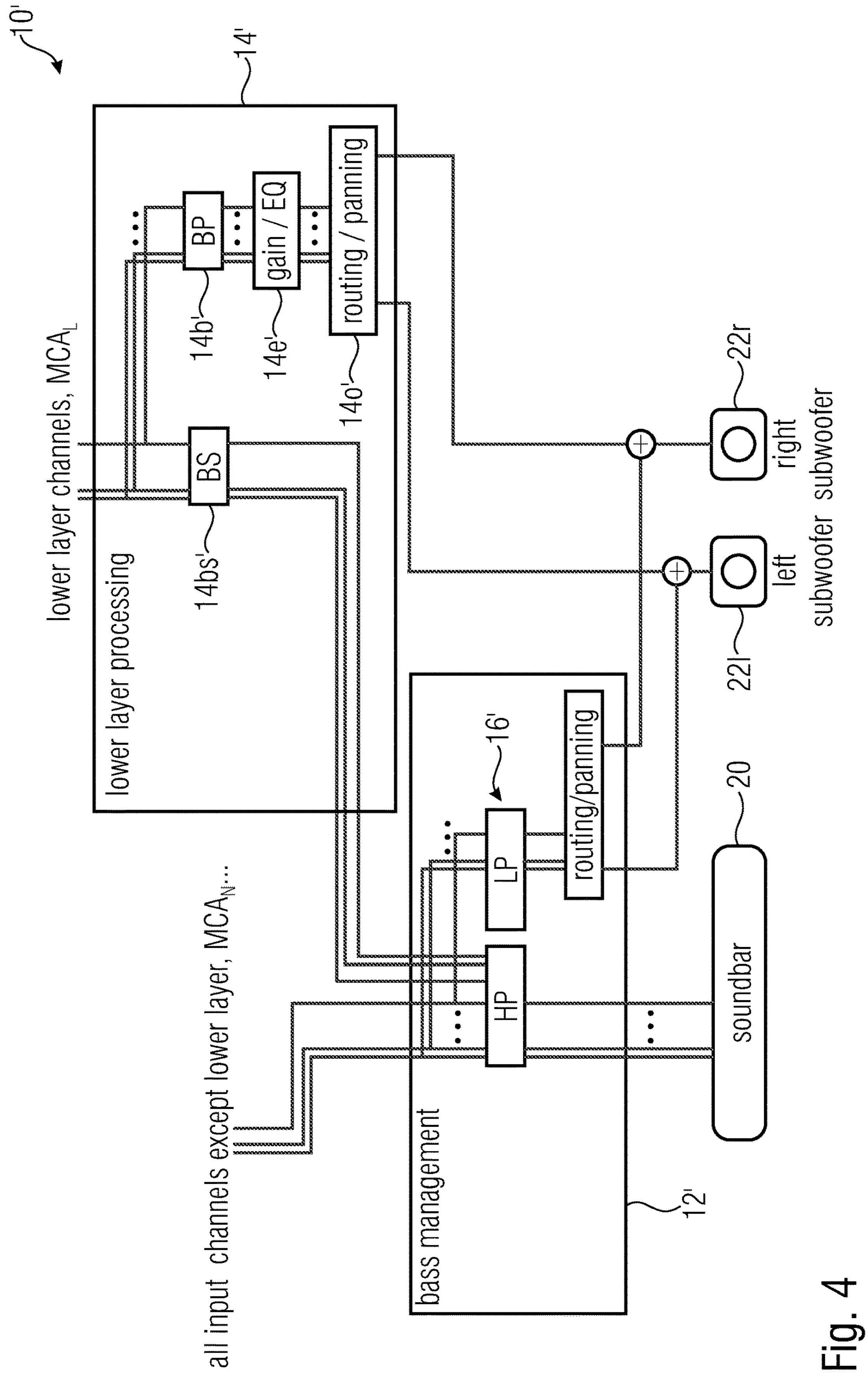
FIG. 4 shows a schematic block diagram of an audio processor in accordance to an enhanced embodiment.

FIG. 4 shows another variant of a processor, namely the processor 10'. This comprises the lower layer processing 14' as well as the normal layer processing 12' including the bass management 16'. Of cause, the normal layer processing 12' (soundbar processing, processor for beamforming, etc.) can further comprise other processing means beside the HP and LP.

The lower layer processing comprises an optional bandpass 14_b_', and optional band stop 14_bs_', an optional equalizer 14_e_' and an output 14_o_'. The band stop forwards the signal or low portion of the signal or a high portion (e.g. above 1500 Hz, above 2500 Hz, above 3000 Hz or above 3500 Hz) of the signal to the normal processing 12' including the base management 16'.

The input MCA to the reproduction system is a multichannel audio file containing sounds that are intended to be played back in different heights (e.g. on a horizontal plane, and below that plane, and above). Since the present invention is mainly concerned with a specific processing for lower array sounds, it is referred to the known technology (e.g. WO2017/021162) with regard to the reproduction of horizontal and 'above ear height' signals by use of the soundbar system. Such, the input signals are exemplarily divided into 'lower layer channels $MCA_L$ and all other channels $MCA_N$.

The 'all other channels' $MCA_N$ passing the (stereo/multichannel) bass management 16' and are then further processed by the soundbar processing 12'. (The order of the soundbar processing and the bass management as well as the specifics of the soundbar 20 processing and potentially included processing to optimize or protect the loudspeakers etc. are not relevant here and can easily be included into the inventive method.)

The lower layer channels are routed to the processing 14', which can perform one, a plurality or all of the below discussed functionalities.

- Extract a specific frequency range (which is adjustable based on the specific system). This frequency range is indicated by a bandpass 14_b_' (BP) in FIG. 4. This bandpass signal can be further processed (e.g. gain modified and EQed to match the other parts of the reproduction system) and is then routed/panned to the two subwoofers
- The complementary signal (i.e. the bandstop signal, indicated as BS 14_bs_' in FIG. 4) is routed differently than the BP signal part and processed like the rest of the input signals (i.e. all other input channels)
- The bandpass limits are selected such, that for a limited frequency range, the signals are played back by the subwoofers. The selection of this frequency range may be such that the signals are located in the same plane as the subwoofers 22_l_, 22_r_ (i.e. on floor level).
- Advantageously, a bandpass signal (as opposed to a fullband signal) is used for playback over the subwoofers 22_l_, 22_r_, since usually subwoofers cannot reproduce (very) high frequency sound in a good quality. Still, they can easily reproduce sounds that are above the usual LFE and bass management crossover-frequencies.
- Furthermore, if the frequencies are getting too high, the sounds could potentially be located as coming directly out of the subwoofers, which is not intended. The loud-speakers/subwoofers themselves should ideally not directly be localized, but rather phantom images generated by the interaction of both subwoofers.
- The sum of the BP and the BS signals is the complete lower array signal, so no signal components are lost during reproduction.
- The system is tuned such, that although the high frequency parts of the signals are played back through the standard soundbar processing, the localization of the lower array sounds is dominated by the floor level subwoofer output. (That can be achieved e.g. by appropriate time-delays between the sounds routed to the subwoofers and those routed to the standard soundbar processing).

Note that the used subwoofer or subwoofers may, for example, be built/configured/tuned in such a way that they can also play back higher frequency range than the usual LFE/bass processing frequency range (bass management frequency range). Usually such (external) subwoofers are positioned on the floor, next to the place where the soundbar is positioned (or in the corners or on the sidewalls). For lower layer sound present in the content, the subwoofers play also high frequency components of those sounds—such, these signals are rendered by a system that is physically positioned on the floor, and will such be perceived from floor level.

According to embodiments, for the LFE or bass management signals, the subwoofers are used as they would be used in a conventional system.

According to further embodiments, above a certain frequency, the lower layer sounds can be redistributed to be not only played back using the subwoofers, but also the soundbar itself (and its processing). The idea behind this step is the following: Since subwoofers usually use large transducers/membranes, they get very directive for high frequencies (i.e. while low frequencies are emitted rather omnidirectional, the actual positioning of the subwoofer is not so important for the evoked perception. Furthermore, low frequencies are anyways not so easily localizable. The higher the frequency gets in comparison to the size of the membrane, the sound emission gets more directive, and sound is emitted predominantly to the forward direction. Such, the positioning of the subwoofer would be an influencing factor for the spatial perception—and that is not intended. It is intended to keep the freedom of the possibility to position the subwoofer where it best fits. [Furthermore, towards higher frequencies, the sound reproduction of a large membrane like that from a subwoofer gets more and more uncontrolled and chaotic]).

According to embodiments, in addition to the low frequency driver, a subwoofer may comprise a high frequency driver (e.g. midrange or tweeter). For example, one embodiment could basically make use of a standard high quality (i.e. able to reproduce low frequency sounds) two- or multiway loudspeaker instead of a dedicated subwoofer.

Another embodiment could focus on adding tweeters or high frequency reproduction to the subwoofers/subwoofer enclosures that aims at achieving a high frequency sound reproduction with little directivity/in such a way that the origin of the sound itself cannot easily be located (to again get rid of the directionality effect and have the freedom to freely position the subwoofer)—such, also higher frequency sounds could directly be played back by the loudspeakers (i.e. subwoofers) that are positioned on the floor.

Of course, if people already have a standard stereo or multichannel reproduction system using (large) loudspeakers, that may be already floor-standing loudspeakers, those could be used for the purpose of lower array reproduction—such a system could then basically be enhanced by a soundbar for the reproduction of the horizontal and upper part according to further embodiments/alternatives. Expressed in other words this means that the subwoofer signal generated by the lower layer processing is used to drive the floor-standing loudspeakers in order to reproduce the lower level sound.

According to embodiments, the sound processing for the lower layer signals could be combined with HRTF- or binaural processing to improve perception of the lower layer channels.

According to further embodiments, the sound processing for the lower layer signals could be combined with/extended by sound processing which optimizes the sound quality, based on the (actual/current) position and/or orientation of the subwoofer(s) and/or the listener(s). This could be applied manually or automatically, offline or in realtime.

The method could also be applied for subwoofer/bass arrays that use more than two subwoofers that are potentially spread out across the room. Furthermore, the method would also work with a system that uses a calibration system. Such, the sound processing for the lower layer signals could be combined with an enhanced room calibration system which would optimize the reproduced sound quality of the subwoofers—and therefore the lower layer channels—to the listening situation in a specific room where the reproduction system is used. Since the proposed invention makes use of multiple subwoofers, the information gathered by the calibration system could also be used to further optimize the modal behavior of the room acoustics by applying active compensation filters to the subwoofers.

If an upmix is part of the sound processing 20, it could be—according to embodiments—extended to incorporate the additional lower layer channels such, that the created sound field gets vertically enhanced/extended, even if the original input signals wouldn't contain lower layer channels.

The above described bass management could be either passive or active bass management.

The bass management can be designed such, that all signals belonging to the left side/left hemisphere are managed/processed separately from the signals belonging to the right side/right hemisphere. (Similar, if two subwoofers would be positioned in the front and back, this separation would also apply according to front hemisphere and back hemisphere.)

While most of the embodiments and figures in this report are based on channel-based input signals, all processing can—according to embodiments—be adopted to work also with object based input where the mapping to specific channels is not given, but the actual spatial position of an audio object may be indicated by metadata delivered together with the actual audio contents. Such objects can either be statically positioned at an indicated position, or change their spatial position dynamically over time. Furthermore, the above method can also be used for Ambisonics and Higher Order Ambisonics and Scene Based audio input formats.

Note, since two or more subwoofer are available, the multichannel bass management could also apply a decorrelation to the potentially only mono bass-signals, to further enhance the perceived spaciousness of the reproduced sound image.

According to a further embodiment, the concept can also be used to extend existing loudspeakers systems by the use of a soundbar. (I.e. if already high quality floor standing speakers are available, those could act as the proposed subwoofers of the above method).

The proposed method can be used to supplement existing soundbar rendering solutions by including a lower layer. This means that the lower layer reproduction method is independent of the rendering strategy (e.g. acoustic or psychoacoustic as exemplified before) that is used for the reproduction of e.g. the horizontal sound or the elevated (above head) sound.

Embodiments provide an audio reproduction system featuring at least one subwoofer, where the subwoofer is configured to play back also high frequency sounds for specific parts of the input signals. (those 'specific parts' would e.g. be the lower array signals, or if object audio would be panned to the respective positions).

According to an embodiment, the audio reproduction system may be a soundbar type.

According to a further embodiment the audio reproduction system features at least two subwoofers.

According to a further embodiment the subwoofers are used (in addition to playing back the LFE and the bass managed low frequency signals) to reproduce the lower array content of immersive multi-channel audio input.

According to a further embodiment, the subwoofers are used (in addition to playing back the LFE and the bass managed low frequency signals) to reproduce object audio when the audio objects are panned to lower array directions.

According to a further embodiment, the additional signals played back by the subwoofer are a bandpass portion of specific input signals ('additional signals'=in addition to playing back the LFE and the bass managed low frequency signals).

According to a further embodiment complementary signals to the bandpass portion of the specific input signals are played back by standard playback means (i.e. e.g. the normal soundbar processing).

Figure 5:
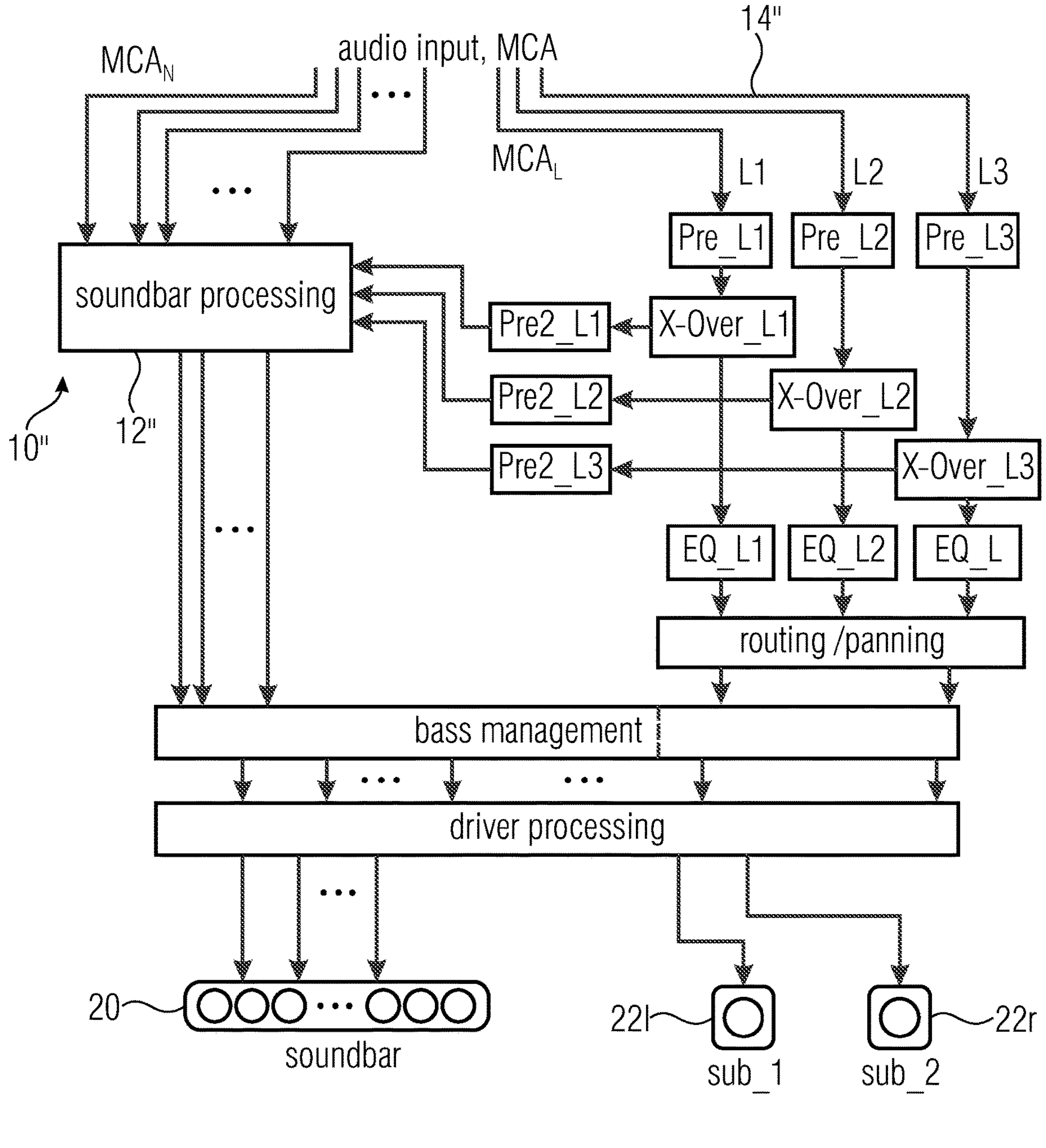
FIG. 5 shows a schematic block diagram of a further audio processor in accordance to an enhanced embodiment

FIG. 5 shows another implementation of the audio processor 10". The soundbar 20 consists of an arrangement of multiple drivers that are driven by loudspeaker feed signals which are calculated in the soundbar processing stage 12" (this stage is also often referred to as virtualization or rendering). The input signals to the soundbar processing stage 12" are the channels $MCA_N$ that address the horizontal and upper layers of the loudspeaker setup the content has been produced for.

The input channels $MCA_L$ for the lower layer sounds (in this specific example three channels, L1, L2, and L3) go through a first preprocessing stage (Pre_L1, Pre_L2, Pre_L3), which is marked by 14". This preprocessing 14" includes e.g. a gain adjustment to match the lower layer sound reproduction to the rest of the system, such this preprocessing stage may be specific to the actual reproduction system.

The high frequency part of the lower layer sounds, which will not be reproduced by the subwoofers **22*l*, 22*r***, is filtered out by the adjustable crossover filters (X-Over) and those signal parts are fed to the soundbar processing. A second preprocessing stage (Pre2_L1, Pre2_L2, Pre2_L3, e.g. gain)

can be used to adjust/align those signal parts to match specific characteristics of the other input signals of the soundbar processing.

The low frequency components of the lower array sounds that are reproduced by the two subwoofers **22*l*, 22*r*** are further equalized (EQ). This EQ is used to achieve a neutral timbre when playing back sounds on the subwoofer with frequencies that are usually not intended to be played back over (standard) subwoofers. (This EQ stage can be tuned by a listener in the product design stage, furthermore, it can be automatically adjusted by a measurement system to adapt to the specific situation in the present listening environment. Furthermore, a part of this EQing could already be stored in some filters that are implemented in the actual subwoofer hardware.)

Since multiple lower layer sounds (three in this example) are played back over only two subwoofers, a panning/routing stage distributes the sounds such that (similar to usual stereo reproduction systems) a phantom image reproduction is achieved to basically simulate the channel for which no specific subwoofer is available.

Subsequently, all processed signals (the ones from the soundbar processing as well as the ones from the lower array processing) go through a bass management system, which can include either active or passive stereo or mono bass management (as explained at another point in the application text).

The subsequent driver processing includes parts like equalization filters and dynamic processing that are used to maximize the systems performance and are also used as safeguard for the actual hardware (e.g. the specific transducers) used in the hardware.

Note, two external subwoofers **22*l* and 22*r* are used in the system. They may be ideally placed on the left and right side of the soundbar 20** on the floor.

As the proposed rendering method reproduces frequencies over the subwoofers which are untypical for usual subwoofer membrane sizes, the frequency dependent characteristics (frequency response, directivity pattern) of the specific subwoofer at hand may be taken into account. Such, average filters to achieve a well-balanced high frequency reproduction in a large area can be generated. Alternatively, the frequency response can be adjusted by a measurement at the actual listening position.

In that respect, the EQ stages indicated in the figure (for the channels L1, L2, and L3) are also used to adjust the individual channels to counter differences in timbre and level that would appear due to the phantom-image reproduction of (at least) one of those channels.

One actual implementation (which is of course adjusted to the specific soundbar system) uses a crossover frequency of 3.5 kHz for X-Over. Such, frequencies below 3.5 kHz are reproduced by the subwoofers (only for the signals of the lower layer input).

Although in above embodiments the usage of two subwoofer has been discussed to enable lower layer sound from two different room directions (Left-right or front-rear), the system/approach may be enhanced to more than the two (e.g. four) subwoofer for reproducing lower layer sound from three, four, etc. room directions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An audio system for reproducing multichannel audio, comprising at least one subwoofer and an audio processor for reproducing object-specific audio or multichannel audio, comprising:

a normal layer processor configured for processing one or more channels of the object-specific audio or of the multichannel audio belonging to a normal layer;

a lower layer processor configured for processing at least one or more channels of the object-specific audio or of the multichannel audio belonging to a lower layer, wherein the normal layer is a listening layer laying within a height of a listener's head as seen from a listener's perspective and wherein the normal layer lies above the lower layer as seen from the listener's perspective;

further comprising a low frequency effect/bass processor which is configured to feed low frequency portions of the normal layer to the subwoofer via the subwoofer output, wherein the low frequency portions of the normal layer comprise frequencies below 1000 Hz;

wherein the lower layer processor is configured to feed at least one high frequency signal of the lower layer to the same subwoofer via the same subwoofer output, so as to reproduce said one or more channels of the lower layer using the same subwoofer, wherein frequencies of the high frequency signal of the lower layer are above 1000 Hz so as to be high enough to enable a localization of the sound generated by the same subwoofer.

2. The audio system according to claim 1, wherein the lower layer processor is configured to feed at least one signal belonging to a first of the one or more channels of the lower layer to a first subwoofer output and to feed at least another signal belonging to a second of the one or more channels of the lower layer to a second subwoofer output.

3. The audio system according to claim 2, wherein the first subwoofer output is assigned to a first lateral room direction and wherein the second subwoofer output is assigned to a second lateral room direction, different from the first room direction.

4. The audio system according to claim 1, wherein the one signal of the one or more channels of the lower layer comprises a frequency portion which comprises only frequencies above a frequency portion of one or more low frequency effect channels, or which is above a crossover frequencies of the one or more channels of the normal layer, or which is above selected crossover frequencies of the one or more channels of the normal layer, and/or wherein the one signal of the one or more channels of the lower layer comprise a frequency portion which comprise only frequencies above 80 Hz, above 100 Hz, above 120 Hz, above 150 Hz, above 200 Hz, above 300 Hz, above 500 Hz, or above 1000 Hz.

5. The audio system according to claim 1, wherein the lower layer processor is configured to route a low frequency portion of the one or more channels of the lower layer to the LFE/bass processor.

6. The audio system according to claim 1, wherein the lower layer processor comprises a bandpass filter for defining a frequency range for the one or more channels belonging to a lower layer; or wherein the lower layer processor comprises a bandpass filter for defining a frequency range for the one or more channels of the lower layer and for virtualization processing.

7. The audio system according to claim 6, wherein the lower layer processor is configured to route a low frequency portion below the defined frequency range of the one or more channels of the lower layer to the LFE/bass processor, wherein the low frequency portion processed by the LFE/bass processor results in signals complementary to signals resulting from the lower portion of the bandpass filtering.

8. The audio system according to claim 1, wherein the lower layer processor is configured to route a high frequency portion of the one or more channels of the lower layer to the normal layer processor, such that the high frequency portion of the one or more channels of the lower layer is reproduced together with the one or more channels of the normal layer.

9. The audio system according to claim 8, wherein the high frequency portion of the one or more channels of the lower layer is reproduced via the normal layer processor by use of a reduced or adapted amplification, when compared to the amplification of the portion reproduced via the lower layer, and/or, wherein the higher frequency portion is reproduced via the normal layer processor in a delayed manner, when compared to the portion reproduced via the lower layer processor.

10. The audio system according to claim 1, wherein the normal layer is a listening layer laying within a height of a listener's head from a listener's perspective, wherein the normal layer lies above the lower layer as seen from the listener's perspective.

11. The audio system according to claim 1, wherein the audio processor comprises a height layer processor for processing one or more channels of the object-specific audio or the multichannel audio belonging to a height layer.

12. The audio system according to claim 1, further comprising a calibration unit for performing a calibration procedure, wherein the calibration procedure comprises a calibration for calibrating the one or more channels of the lower layer reproduced by use of a subwoofer output.

13. The audio system according to claim 1, wherein the audio processor comprises an up/downmixing unit which is configured to perform an upmixing or downmixing of the lower layer out of one or more channels of the normal layer, for conventional stereo or multichannel audio, or which is configured to perform a rendering of objects arranged at lower positions to the lower layer for object-specific audio.

14. The audio system according to claim 1, further comprising:

at least one soundbar or sound system for reproducing a normal layer.

15. The audio system according to claim 14, wherein the at least one subwoofer or the at least one two-way audio loudspeaker or the at least one multi-way audio loudspeaker is arranged at the floor.

16. The audio system according to claim 14, wherein the at least one subwoofer or the at least two-way audio loudspeaker or the at least one multi-way audio loudspeaker comprises a midrange transducer or a tweeter.

17. A method for reproducing multichannel audio using an audio system according to claim 1, comprising processing one or more channels of object-specific audio or multichannel audio belonging to a normal layer;

processing at least one channel or more channels of the object-specific audio or the multichannel audio belonging to a lower layer;

wherein the normal layer lies above the lower layer, wherein the processing of the one or more channels of the lower layer comprises a sub-step of feeding at least one signal belonging to the one or more channels of the lower layer to a subwoofer output.

18. The method according to claim 17, wherein the normal layer is reproduced using a soundbar or a sound system.

19. A non-transitory digital storage medium having stored thereon a computer program for performing a method for reproducing multichannel audio using an audio system according to claim 1, comprising processing one or more channels of object-specific audio or multichannel audio belonging to a normal layer;

processing at least one channel or more channels of the object-specific audio or the multichannel audio belonging to a lower layer;

wherein the normal layer lies above the lower layer, wherein the processing of the one or more channels of the lower layer comprises a sub-step of feeding at least one signal belonging to the one or more channels of the lower layer to a subwoofer output, when said computer program is run by a computer.

20. The audio system according to claim 1, wherein the one signal of the one or more channels of the lower layer comprise a frequency portion which comprise only frequencies above 80 Hz, above 100 Hz, above 120 Hz, above 150 Hz, above 200 Hz, above 300 Hz, above 500 Hz, or above 1000 Hz.

* * * * *